Aug. 7, 1956 O. I. STEIGERWALT ET AL 2,757,443

METHOD OF MAKING PRINTED CIRCUITS

Filed Jan. 21, 1953 2 Sheets-Sheet 1

INVENTORS
Oliver I Steigerwalt
Howard I Oshry

BY Ralph Hammar
ATTORNEY

METHOD OF MAKING PRINTED CIRCUITS

Filed Jan. 21, 1953 2 Sheets-Sheet 2

INVENTORS
Oliver I Steigerwalt
Howard I Oshry
BY Ralph Hammar
ATTORNEY

United States Patent Office 2,757,443

Patented Aug. 7, 1956

2,757,443

METHOD OF MAKING PRINTED CIRCUITS

Oliver I. Steigerwalt and Howard I. Oshry, Erie, Pa., assignors to Erie Resistor Corporation, Erie, Pa., a corporation of Pennsylvania Application January 21, 1953, Serial No. 332,272

1 Claim. (Cl. 29—155.5)

This invention is an improvement over application Serial No. 315,050 filed October 16, 1952, now Patent 2,716,268 issued August 30, 1955.

As there disclosed, metal foil with an underlying adhesive is embossed into a felt like plastic impregnated sheet under heavy pressure in a molding press and the sheet is thereafter cured under heat and pressure in the same press but not necessarily at the same pressure. Following the curing step, the surface of the sheet is cut away to a depth below the unembossed portions of the sheet leaving only the embossed portions which are firmly cemented to the cured plastic sheet and comprise a printed circuit.

With this method there is a tendency for the adhesive to squeeze out from under the embossed portions where the pressure is heaviest so the greatest adhesion is obtained in the unembossed portions which are to be removed.

The present invention is intended to eliminate the problem of adhesive flow by pre-embossing the felt like plastic sheet and then embossing the foil into the pre-embossed sheet. By this pre-embossing step the tendency for the adhesive to squeeze out from under the embossed portions is eliminated.

Figure 1:
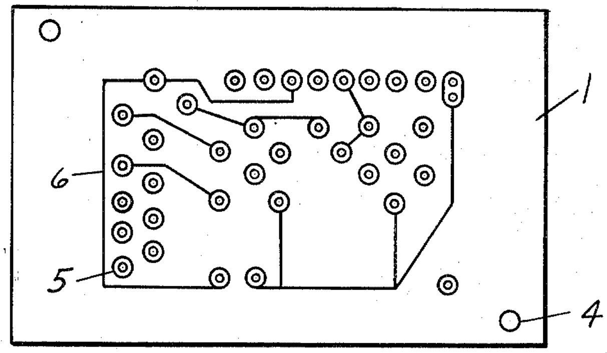
Figure 2:
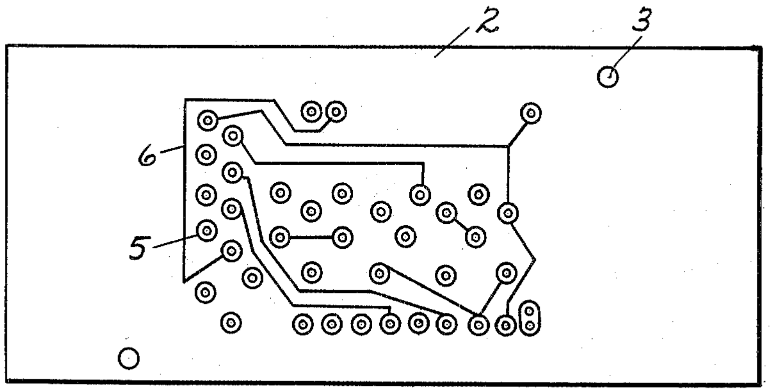
Figure 3:
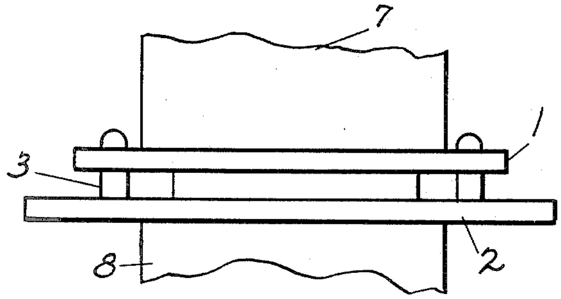
Figure 6:
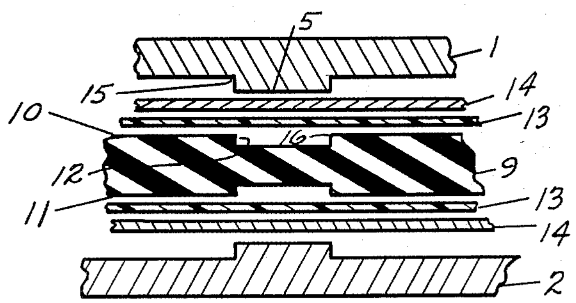
Figure 7:
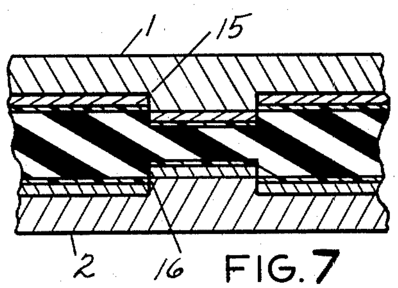
Figure 9:
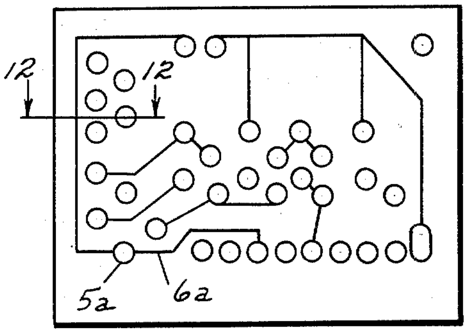
Figure 8:
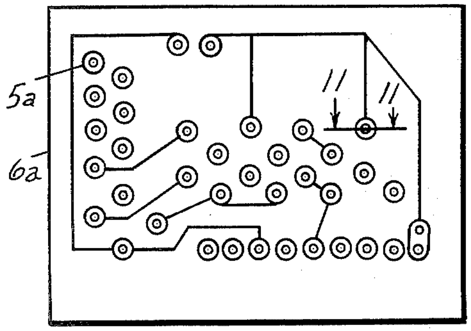
Figure 11:
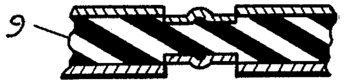
Figure 10:
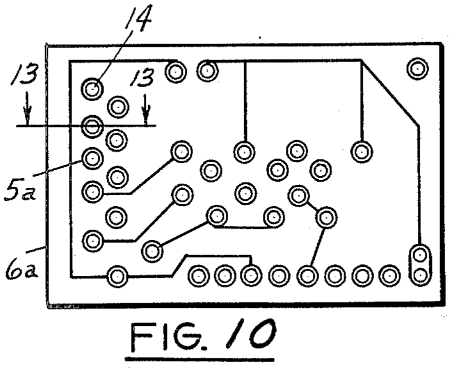
Figure 12:
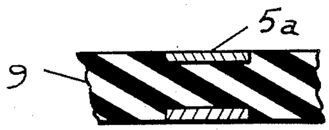
Figure 13:
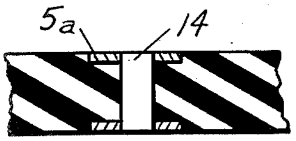

In the accompanying drawing, Figs. 1 and 2 are plan views of the embossing dies; Fig. 3 is a side view of the embossing dies in a press, Figs. 4 and 5 are fragmentary views showing the successive steps of the pre-embossing operation, Figs. 6 and 7 are fragmentary views showing the successive steps of conforming and uniting foil to the pre-embossed surface, Fig. 8 is a plan view of one side of the electric circuit element as it comes from the press, Fig. 9 is a similar view after the parts of the foil which have not been embossed have been cut away, Fig. 10 is a similar view after the terminal portions of the circuit have been punched so as to receive rivets, and Figs. 11, 12, and 13 are fragmentary sectional views on the correspondingly numbered lines of Figs. 8, 9 and 10.

Referring to the drawing, 1 and 2 indicate a pair of embossing dies which are provided with aligning means consisting of pins 3 in the die 2 which fit in holes 4 in the die 1. On the working faces of the dies there are raised projections such as terminals 5 and leads 6. These projections are arranged in the pattern of the circuit. These projections are easily made by coating the working faces of the dies with a resist in the areas in which the projections are to be formed and then etching away the remainder of the surface of the die so that the projections extend of the order of 15 thousandths of an inch above the etched surface. The terminal portions 5 of the dies 1 and 2 register with each other so that in the completed circuit element, the terminals may be connected by rivets extending through the sheet. The terminals may be soldered to leads of electric circuit components or contact clips may be riveted to the terminals. The lead portions 6 make circuit interconnections between the various terminals and the elements connected thereto. The lead portions 6 do not register and the arrangement of the leads and terminal portions obviously is subject to wide variations depending upon the requirements of the electric circuit.

In use, the dies 1 and 2 are arranged in a press having platens 7 and 8. The characteristics of the press and of the platens are determined by the operation to be performed. It is not necessary that all of the operations be performed in a single press with the same pair of dies although this is possible.

Figure 4:
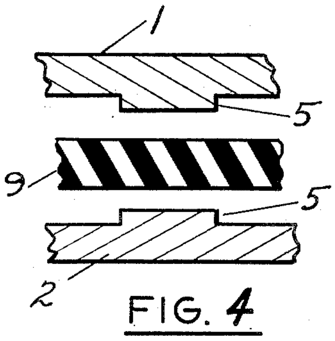
Figure 5:
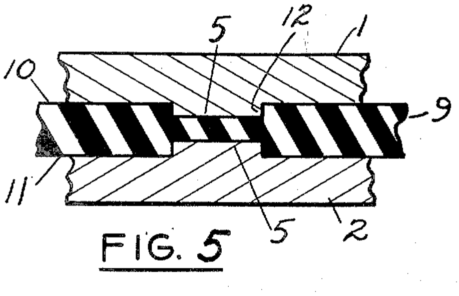

Initially as shown in Figs. 4 and 5 the dies 1 and 2 are closed together on a plastic base sheet 9 which may for example comprise a felt like sheet of paper fiber impregnated with a thermosetting phenolic resin felted together on a paper machine so as to produce a sheet which can be further deformed under pressure. Other fibers such as glass may be used. Other plastics may also be used. Melamine and diallyl phthalate have been used. Diallyl phthalate has good adhesion to metal so that no additional adhesive is required. It is not necessary that the plastic be thermosetting as thermoplastic resins may also be used. It is also not necessary that the fibers be felted as woven fibers are usable. It is of course necessary that the base sheet have suitable electrical properties and this may dictate the composition if the electrical requirements are severe.

The purpose of the steps indicated in Figs. 4 and 5 is to compact the opposite surfaces of the base sheet 9 and to pre-emboss into the compacted surfaces depressions corresponding to the projections 5 and 6 which are ultimately to form the pattern of the printed electric circuit. As can be seen from Figs. 4 and 5, the initial contact of the dies 1 and 2 with the intermediate base sheet 9 is at the projections and the heaviest pressure is developed under the projections. There is however a substantial compacting of the entire surface of the base sheet 9 so that at the end of the pre-embossing step indicated in Fig. 5 the entire surface of the base sheet 9 in contact with the dies 1 and 2 has been compressed. It may or may not be necessary that the dies 1 and 2 be heated during the pre-embossing step. However even if the dies are heated, the pre-embossing step takes so little time that the plastic base sheet 9 will not ordinarily be cured or set to its final condition. At the end of the pre-embossing step the plastic base sheet will have its opposite faces 10 and 11 compacted and will have depressions 12 therein corresponding to the projections on the dies 1 and 2.

In the next step illustrated in Fig. 6 there is loaded between the dies 1 and 2 and the pre-embossed or compacted surfaces 10 and 11 of the plastic sheet 9, sheets 13 of adhesive and sheets 14 of metal foil. The adhesive will be adjacent the surfaces 10 and 11 and the foil will be adjacent the dies 1 and 2. The adhesive may be precoated on the film 14 instead of being a separate film as illustrated. Furthermore if the plastic in the base sheet 9 has the property of physically wetting and adhering to the metal foil 14 the adhesive may be omitted. The cement 13 must be of a type which cures or sets under the same conditions as the base sheet 9. For the paper fiber phenolic base sheet the adhesive may, for example, be Minnesota Mining Type 583.

The foil 14 can conveniently be thin copper. Preferably the side of the foil adjacent the base sheet 9 has an etched or roughened surface such as is obtained on one surface of electrolytic copper foil. The opposite surface of the foil is preferably pre-tinned or coated with soft solder such as 60 tin-40 lead.

As the dies 1 and 2 are closed under pressure from the Fig. 6 to the Fig. 7 position, the projections on the dies 1 and 2 make the initial contact with the foil 14 and punch the portions of the foil in contact therewith into the registering depressions 12 previously embossed into the base 9. From one aspect, the previously embossed portions 12 comprise dies and the projections 5 and 6 on the dies 1 and 2 comprise punches. Whether the foil which is pushed or punched into the depressions 12 is separate from the rest of the foil as indicated in Fig. 7 or whether it is merely drawn down into the depressions 12 depends to a considerable extent on the sharpness of the corners 15 at the junction between the projections 5 and 6 and the etched surface of the dies 1 and 2. If the corners 15 are sharp, the pre-embossed depressions 12 will have sharp upper edges 16 and there will be a tendency for the foil with the underlying adhesive to shear as the projections enter the embossed depressions 12. On the other hand if the corners 15 are rounded the edges 16 will likewise be rounded and there will be a tendency for the foil adhesive to be drawn down into the pre-embossed depressions 12. In actual practice, some parts of the foil may be drawn into the pre-embossed depressions 12 and other parts of the foil may be sheared out of the sheet and punched into the bottom of the pre-embossed depressions 12. In either case, there is no tendency to develop maximum pressure at the bottom of the pre-embossed depressions 12 which might tend to squeeze the adhesive out of the depressions. It is important that the adhesive underlying the foil in the bottom of the depressions remain in place because, as will be subsequently pointed out, the part of the foil in the bottom of the depressions 12 remains in the finished product and should have the maximum adherence. When the dies 1 and 2 reach the Fig. 7 position, the foil has been pressed into conforming surface contact with the previously embossed surface of the base 9 and the portions of the foil registering with the previous embossings 12 had been embossed to a depth below the remainder of the foil.

The dies are maintained in the Fig. 7 position until the heat transferred from the heated platens 7 and 8 of the press cures or sets the plastic. The temperature of the platens 7 and 8 and the pressure applied thereby to the dies 1 and 2 is determined by the molding characteristics of the plastic sheet 9. The pressure applied during the molding or curing operation shown in Fig. 7 may or may not be the same as the pressure applied during the pre-embossing operation shown in Fig. 5. It is advantageous that both of these operations may be separately carried out and at the most suitable pressure for each operation.

At the end of the curing operation, the element has the appearance indicated in Figs. 8 and 11. Both exposed surfaces of the base sheet 9 are entirely covered by foil 14 and there are embossed depressions 5*a* and 6*a* corresponding to the terminal and lead forming projections 5 and 6 of the dies 1 and 2. As is apparent from the section, Fig. 11, the embossed portions 5*a* or 6*a* are substantially below the under surface of the foil, so that if the completed element is fed through a surface grinder or is held against a sanding belt or disk the entire unembossed portion of the foil can be ground or abraded away to a depth below the unembossed portion leaving a smooth sanded or ground surface on the base sheet with the embossed portion 5*a*, 6*a* substantially flush with the ground surface as shown in Figs. 9 and 12. After punching the holes 14 in the terminal portions 5*a* the element then has the appearance shown in Figs. 10 and 13, and is ready for connection to the desired circuit elements and tubes.

By the method so far followed there is produced a base of insulating material having embedded therein conductor and terminal elements which facilitate the manufacture of the complete circuit. The embossing dies 1 and 2 are very economically produced by standard photo engraving methods. By having the embossing dies pre-embossed the plastic sheet 9 there is eliminated the problem of squeezing of adhesive out from and under the embossed portions which in the absence of the pre-embossing step would be subject to the greatest pressure.

We claim:

The method of making printed electric circuits which comprises compacting a surface of an uncured deformable felt like base of fibers and an impregnating plastic and simultaneously embossing the surface to form a circuit pattern of depressions having bottoms which are to comprise the finished printed circuit comprising a part of the surface area of the base and substantially below the remainder of the surface around the depressions, loading a flat sheet of metal foil with an underlying adhesive over the previously embossed and compacted surface of the base, pressing the foil with the underlying adhesive into conforming surface contact with the previously embossed surface of the base with the foil conforming to the depressions and to the remainder of the surface of the base, maintaining the pressure at the curing or setting temperature and pressure for the base until the foil is united throughout the surface of the cured base with the circuit pattern differentiated from the balance of the foil by being in the depressions below the level of the surrounding surface, and subjecting the entire foil coated surface area to a surface cutting operation to a level below the thickness of the foil but short of the foil in the bottoms of the depressions to leave only the circuit pattern united with the base.

References Cited in the file of this patent

UNITED STATES PATENTS

| | | |
|---|---|---|
| 2,055,570 | Bradley | Sept. 29, 1936 |
| 2,288,735 | O'Connell | June 7, 1942 |
| 2,427,144 | Jansen | Sept. 9, 1947 |
| 2,441,960 | Eisler | May 25, 1948 |
| 2,447,541 | Sabee et al. | Aug. 24, 1948 |

FOREIGN PATENTS

| | | |
|---|---|---|
| 596,830 | Germany | May 11, 1934 |